No. 693,757. Patented Feb. 18, 1902.
W. TAYLOR.
STORAGE BATTERY.
(Application filed July 28, 1900.)
(No Model.)
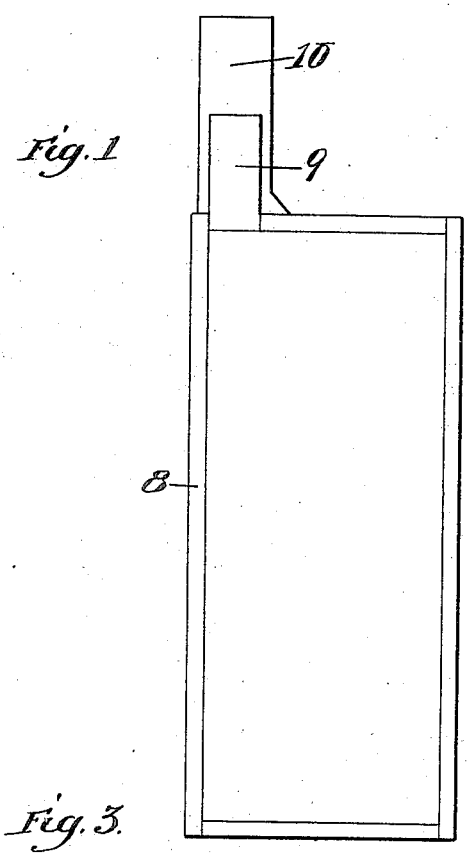
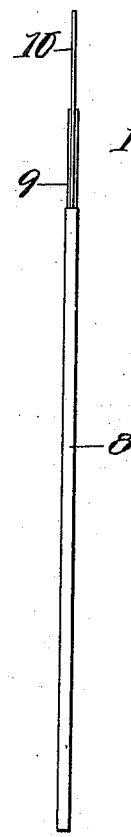
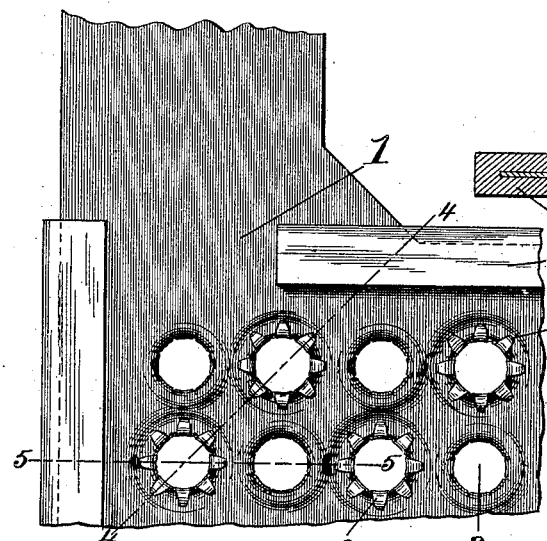
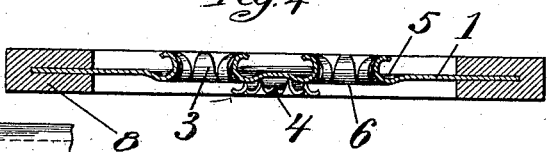
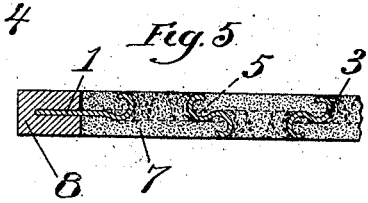
Witnesses:
H. B. Hallock.
Inventor.
William Taylor
By Augustus B. Stoughton
Atty.
THE NORRIS PETERS CO., PHOTO-LITHO., WASHINGTON, D. C.

UNITED STATES PATENT OFFICE.

WILLIAM TAYLOR, OF PHILADELPHIA, PENNSYLVANIA, ASSIGNOR TO THE ELECTRIC STORAGE BATTERY COMPANY, OF PHILADELPHIA, PENNSYLVANIA, A CORPORATION OF NEW JERSEY.

STORAGE BATTERY.

SPECIFICATION forming part of Letters Patent No. 693,757, dated February 18, 1902.

Application filed July 28, 1900. Serial No. 25,128. (No model.)

*To all whom it may concern:*

Be it known that I, WILLIAM TAYLOR, a citizen of the United States, residing at the city of Philadelphia, in the county of Philadelphia and State of Pennsylvania, have invented certain new and useful Improvements in Storage Batteries, of which the following is a specification.

One object of the present invention is to provide a plate which shall be comparatively very light and yet mechanically strong in proportion to its electrical capacity.

Another object of the invention is to provide for holding the active material or material to become active properly in position upon a support consisting of thin sheet-lead.

Another object of the invention is to provide for the convenient application of the active material or material to become active to a support consisting of sheet-lead.

To these and other ends hereinafter set forth the invention comprises the improvements to be presently described and claimed.

The nature, characteristic features, and scope of my invention will be more fully understood from the following description, taken in connection with the accompanying drawings, forming part hereof, and in which—

Figures 1 and 2 are respectively a side and an edge view of a plate embodying features of the invention. Fig. 3 is a view drawn to an enlarged scale and illustrating a support embodying features of my invention prior to the application of the active material or material adapted to become active. Fig. 4 is a sectional view taken on the line 4 4 of Fig. 3, and Fig. 5 is a sectional view taken on the line 5 5 of Fig. 3, showing also the active material or material adapted to become active.

In the drawings, 1 is a thin sheet of lead torn or punctured to form a series of openings 2.

3 represents tangs or prongs which are formed during the puncturing or tearing and which are pointed at their ends 4. As shown, these tangs or prongs project from opposite faces of the sheet. The points or ends 4 of these tangs or prongs are bent inward toward the sheet 1, and the portions 5 of the sheet adjacent to the shanks 6 of the prongs or tangs are offset from the points 4 of the same and form retaining-pockets.

The described support may be manufactured by first punching the sheet-lead, and thereby producing pointed tangs or prongs flaring outwardly from each other, with their points sticking upward, and then subjecting the sheet to pressure, whereby the points are turned downward and the offset pockets are produced. The presence of the retaining-pockets 5 and the fact that the points 4 are directed inward toward the sheet insure firm and proper electrical and mechanical contact between the sheet 1 and the active material or material adapted to become active 7. Since the points or ends 4 are directed toward the sheet, it follows that the active material or material to become active can be readily applied in the customary way and by means of a trowel or like instrument, which may not catch under the points, as it would do if they were directed upwardly. The turning of the points 4 inward toward the sheet also permits of the application of a comparatively thin layer of active material or material adapted to become active, and this is in many cases desirable.

8 represents grooved strips of hard rubber or the like applied to the margins or edges of the plate in order to impart to it mechanical strength, and the faces of the strips, as shown, lie substantially flush with the bent portions of the tangs or progs.

9 represents strips of hard rubber or other material, and they serve to protect the portions of the lug or terminal 10 which are exposed to the surface of the acid or electrolyte.

It will be obvious to those skilled in the art to which my invention appertains that modifications may be made in detail without departing from the spirit thereof. Hence I do not limit myself to the precise construction and arrangement of parts hereinabove set forth and illustrated in the accompanying drawings; but,

Having thus described the nature and ob- jects of my invention, what I claim as new, and desire to secure by Letters Patent, is—

A support for the active material or material to become active of a battery-plate, which comprises a thin sheet of lead torn or punctured to form a series of openings from which project tangs or prongs each having its point bent inward in respect to the sheet and the portions of the sheet adjacent to the perforations being offset from the points of the tangs or prongs, substantially as described.

In testimony whereof I have hereunto signed my name.

WILLIAM TAYLOR.

Witnesses:
W. J. JACKSON,
K. M. GILLIGAN.